(12) United States Patent
Zhang et al.

(10) Patent No.: US 11,295,303 B2
(45) Date of Patent: *Apr. 5, 2022

(54) METHOD, APPARATUS AND ELECTRONIC DEVICE FOR BLOCKCHAIN TRANSACTIONS

(71) Applicant: ADVANCED NEW TECHNOLOGIES CO., LTD., Grand Cayman (KY)

(72) Inventors: Wenbin Zhang, Hangzhou (CN); Lichun Li, Hangzhou (CN); Baoli Ma, Hangzhou (CN); Zheng Liu, Hangzhou (CN); Shan Yin, Hangzhou (CN)

(73) Assignee: ADVANCED NEW TECHNOLOGIES CO., LTD., George Town (KY)

( * ) Notice: Subject to any disclaimer, the term of this patent is extended or adjusted under 35 U.S.C. 154(b) by 267 days.

This patent is subject to a terminal disclaimer.

(21) Appl. No.: 16/531,609

(22) Filed: Aug. 5, 2019

(65) Prior Publication Data
US 2020/0042999 A1 Feb. 6, 2020

(30) Foreign Application Priority Data
Aug. 6, 2018 (CN) .......................... 201810887463.2

(51) Int. Cl.
*G06Q 20/38* (2012.01)
*G06Q 20/40* (2012.01)
(Continued)

(52) U.S. Cl.
CPC ......... *G06Q 20/389* (2013.01); *G06Q 20/383* (2013.01); *G06Q 20/3825* (2013.01);
(Continued)

(58) Field of Classification Search
None
See application file for complete search history.

(56) References Cited

U.S. PATENT DOCUMENTS

| 4,926,480 | A | 5/1990 | Chaum |
|---|---|---|---|
| 7,509,498 | B2 | 3/2009 | Brickell |

(Continued)

FOREIGN PATENT DOCUMENTS

| CN | 106549749 A | 3/2017 |
|---|---|---|
| CN | 106911470 A | 6/2017 |

(Continued)

OTHER PUBLICATIONS

Franca, "Homomorphic Mini-blockchain Scheme," all pages. (Year: 2015).*

(Continued)

*Primary Examiner* — Jacob C. Coppola (57) ABSTRACT

A method comprises: selecting one or more blockchain assets from a remitter's blockchain account according to a transaction amount of a transaction to be remitted from the remitter's blockchain account into a receiver's blockchain account, wherein a total asset amount represented by the selected one or more blockchain assets is not less than the transaction amount, and a commitment of an individual asset amount represented by each of the selected one or more blockchain assets is recorded in a blockchain; generating a commitment of the transaction amount; and submitting to the blockchain the transaction comprising information of the selected one or more blockchain assets and the commitment of the transaction amount, for the selected one or more blockchain assets to be removed from the remitter's blockchain account and one or more blockchain assets corresponding to the commitment of the transaction amount to be added to the receiver's blockchain account.

20 Claims, 5 Drawing Sheets (51) Int. Cl.
*H04L 9/06* (2006.01)
*G06F 16/23* (2019.01)

(52) U.S. Cl.
CPC ....... *G06Q 20/3829* (2013.01); *G06Q 20/401* (2013.01); *G06F 16/2379* (2019.01); *G06Q 2220/10* (2013.01); *H04L 9/0637* (2013.01); *H04L 2209/38* (2013.01)

(56) References Cited

U.S. PATENT DOCUMENTS

| | | |
|---|---|---|
| 7,716,484 B1 | 5/2010 | Kaliski, Jr. |
| 7,797,537 B2 | 9/2010 | Kurita et al. |
| 8,316,237 B1 | 11/2012 | Felsher et al. |
| 8,527,777 B2 | 9/2013 | Camenisch et al. |
| 8,762,741 B2 | 6/2014 | Chase et al. |
| 8,819,439 B2 | 8/2014 | Camenisch et al. |
| 8,825,555 B2 | 9/2014 | Gross et al. |
| 9,485,092 B2 | 11/2016 | Smets et al. |
| 10,046,228 B2 | 8/2018 | Tran et al. |
| 10,373,129 B1 * | 8/2019 | James .................. H04L 9/3247 |
| 11,080,665 B1 | 8/2021 | Poelstra et al. |
| 2002/0123967 A1 | 9/2002 | Wang |
| 2003/0084291 A1 | 5/2003 | Yamamoto et al. |
| 2003/0187684 A1 | 10/2003 | Bartolini et al. |
| 2007/0116283 A1 | 5/2007 | Tuyls et al. |
| 2007/0294183 A1 | 12/2007 | Camenisch et al. |
| 2008/0235245 A1 | 9/2008 | Huras et al. |
| 2009/0010439 A1 | 1/2009 | Okamoto et al. |
| 2009/0119505 A1 | 5/2009 | Ward et al. |
| 2009/0177591 A1 | 7/2009 | Thorpe et al. |
| 2009/0281949 A1 | 11/2009 | Coppinger |
| 2009/0305673 A1 | 12/2009 | Mardikar |
| 2010/0142704 A1 | 6/2010 | Camenisch et al. |
| 2012/0116978 A1 | 5/2012 | Bruynse et al. |
| 2012/0209790 A1 | 8/2012 | Szydlo |
| 2012/0278609 A1 | 11/2012 | Camenisch et al. |
| 2012/0317034 A1 | 12/2012 | Guha et al. |
| 2014/0201069 A1 | 7/2014 | Arentz |
| 2014/0365776 A1 | 12/2014 | Smets et al. |
| 2015/0033301 A1 | 1/2015 | Pianese et al. |
| 2015/0206124 A1 | 7/2015 | Aubin et al. |
| 2015/0371224 A1 | 12/2015 | Lingappa |
| 2016/0292672 A1 | 10/2016 | Fay et al. |
| 2016/0300234 A1 | 10/2016 | Moss-pultz et al. |
| 2016/0306982 A1 | 10/2016 | Seger, II et al. |
| 2016/0342976 A1 | 11/2016 | Davis |
| 2016/0342978 A1 | 11/2016 | Davis et al. |
| 2016/0358165 A1 | 12/2016 | Maxwell |
| 2017/0004497 A1 | 1/2017 | Mestré et al. |
| 2017/0033932 A1 | 2/2017 | Truu et al. |
| 2017/0085555 A1 | 3/2017 | Bisikalo et al. |
| 2017/0154331 A1 | 6/2017 | Voorhees |
| 2017/0177898 A1 | 6/2017 | Dillenberger |
| 2017/0228728 A1 | 8/2017 | Sullivan |
| 2017/0236121 A1 | 8/2017 | Lyons et al. |
| 2017/0243193 A1 | 8/2017 | Manian et al. |
| 2017/0250972 A1 | 8/2017 | Ronda et al. |
| 2017/0310653 A1 | 10/2017 | Zhang |
| 2017/0316497 A1 | 11/2017 | Song et al. |
| 2017/0353309 A1 | 12/2017 | Gray |
| 2017/0372392 A1 | 12/2017 | Metnick et al. |
| 2018/0006823 A1 | 1/2018 | Carbajal et al. |
| 2018/0026784 A1 | 1/2018 | Ward et al. |
| 2018/0032383 A1 | 2/2018 | Surcouf et al. |
| 2018/0034634 A1 | 2/2018 | Benarroch Guenun et al. |
| 2018/0089644 A1 | 3/2018 | Chen et al. |
| 2018/0144114 A1 | 5/2018 | Fiske |
| 2018/0167198 A1 | 6/2018 | Muller et al. |
| 2018/0167208 A1 | 6/2018 | Le Saint et al. |
| 2018/0191503 A1 | 7/2018 | Alwar et al. |
| 2018/0234409 A1 | 8/2018 | Nelson et al. |
| 2018/0253702 A1 | 9/2018 | Dowding |
| 2018/0293576 A1 | 10/2018 | Song et al. |
| 2018/0294955 A1 | 10/2018 | Hwan |
| 2018/0309737 A1 | 10/2018 | Jawaharlal et al. |
| 2018/0315309 A1 | 11/2018 | Becker |
| 2018/0323974 A1 | 11/2018 | Gao et al. |
| 2018/0331832 A1 | 11/2018 | Pulsifer |
| 2018/0331835 A1 | 11/2018 | Daniel |
| 2018/0367298 A1 | 12/2018 | Wright et al. |
| 2019/0052458 A1 | 2/2019 | Wright et al. |
| 2019/0066228 A1 | 2/2019 | Wright |
| 2019/0081796 A1 | 3/2019 | Chow et al. |
| 2019/0130399 A1 | 5/2019 | Wright et al. |
| 2019/0164153 A1 | 5/2019 | Agrawal et al. |
| 2019/0171744 A1 | 6/2019 | Ananthapur Bache et al. |
| 2019/0172057 A1 | 6/2019 | Vincent |
| 2019/0180275 A1 | 6/2019 | Safak |
| 2019/0205873 A1 | 7/2019 | Kamalsky et al. |
| 2019/0236879 A1 | 8/2019 | Ivanov et al. |
| 2019/0244195 A1 | 8/2019 | Ma et al. |
| 2019/0268312 A1 | 8/2019 | Ma et al. |
| 2019/0287095 A1 | 9/2019 | Gaddam et al. |
| 2019/0327082 A1 * | 10/2019 | Ow ....................... H04L 9/3213 |
| 2019/0327216 A1 | 10/2019 | Walters |
| 2019/0386940 A1 | 12/2019 | Hong et al. |
| 2020/0007318 A1 | 1/2020 | Camenisch et al. |
| 2020/0042726 A1 | 2/2020 | Lawrenson et al. |
| 2020/0051361 A1 | 2/2020 | Cui et al. |
| 2020/0053054 A1 | 2/2020 | Ma et al. |
| 2020/0119910 A1 | 4/2020 | Ojha et al. |
| 2020/0145192 A1 | 5/2020 | Elkhiyaoui et al. |
| 2020/0211011 A1 | 7/2020 | Anderson |
| 2020/0213085 A1 | 7/2020 | Fletcher |
| 2021/0089676 A1 | 3/2021 | Ford et al. |

FOREIGN PATENT DOCUMENTS

| | | | |
|---|---|---|---|
| CN | 107025602 A | 8/2017 | |
| CN | 107077670 A | 8/2017 | |
| CN | 108512650 A | 9/2017 | |
| CN | 107239951 A | 10/2017 | |
| CN | 107451175 A | 12/2017 | |
| CN | 107679857 A | 2/2018 | |
| CN | 108062671 A | 5/2018 | |
| CN | 108282459 A | 7/2018 | |
| CN | 108288159 A | 7/2018 | |
| CN | 108320228 A | 7/2018 | |
| CN | 108418689 A | 8/2018 | |
| CN | 108683669 A | 10/2018 | |
| CN | 108711105 A | 10/2018 | |
| CN | 108764874 A | 11/2018 | |
| CN | 108876332 A | 11/2018 | |
| CN | 109003184 A | 12/2018 | |
| EP | 0773647 A2 | 5/1997 | |
| EP | 3576033 A1 | 12/2019 | |
| EP | 3523919 B1 * | 8/2020 | ............... G07F 7/10 |
| JP | 2000-207466 A | 7/2000 | |
| JP | 2000-299683 A | 10/2000 | |
| JP | 2007-510947 A | 4/2007 | |
| JP | 2007-226777 A | 9/2007 | |
| JP | 2010-135928 A | 6/2010 | |
| JP | 2013-98666 A | 5/2013 | |
| JP | 2018-055203 A | 4/2018 | |
| JP | 2018-157432 A | 10/2018 | |
| JP | 2020-71617 A | 5/2020 | |
| KR | 10-2016-0024185 A | 3/2016 | |
| KR | 10-1802655 B1 | 11/2017 | |
| RU | 2536666 C2 | 12/2014 | |
| RU | 2636105 C1 | 11/2017 | |
| RU | 2651245 C2 | 4/2018 | |
| TW | 201733303 A | 9/2017 | |
| TW | 201810151 A | 3/2018 | |
| TW | M561861 U | 6/2018 | |
| TW | I636411 B | 9/2018 | |
| WO | 01/69843 A2 | 9/2001 | |
| WO | 0180479 A1 | 10/2001 | |
| WO | 2002/039391 A2 | 5/2002 | |
| WO | 2006121322 A1 | 11/2006 | |
| WO | 2009151832 A2 | 12/2009 | |
| WO | 2013049689 A1 | 4/2013 | |
| WO | 2016/200885 A1 | 12/2016 | |
| WO | 2017/145016 A1 | 8/2017 | |

(56) References Cited

FOREIGN PATENT DOCUMENTS

| WO | 2017145010 | A1 | | 8/2017 | | |
| WO | 2017178956 | A1 | | 10/2017 | | |
| WO | 2018019364 | A1 | | 2/2018 | | |
| WO | 2018126065 | A1 | | 7/2018 | | |
| WO | 2018/168152 | A1 | | 9/2018 | | |
| WO | 2018185724 | A1 | | 10/2018 | | |
| WO | 2018189634 | A1 | | 10/2018 | | |
| WO | 2018189667 | A1 | | 10/2018 | | |
| WO | 2018193355 | A1 | | 10/2018 | | |
| WO | 2018203186 | A1 | | 11/2018 | | |
| WO | 2018207064 | A1 | | 11/2018 | | |
| WO | 2018229632 | A1 | | 12/2018 | | |
| WO | WO-2018229632 | A1 | * | 12/2018 | ............... | H04L 9/30 |
| WO | WO-2019003072 | A1 | * | 1/2019 | ........... | H04L 9/3239 |

OTHER PUBLICATIONS

Poon et al., "The Bitcoin Lightning Network: Scalable Off-Chain Instant Payments," all pages. (Year: 2016).*
Written Opinion of the International Searching Authority and International Search Report for PCT Application No. PCT/CN2018/117548 dated Aug. 28, 2019 (7 pages).
Written Opinion of the International Searching Authority and International Search Report for PCT Application No. PCT/CN2018/117552 dated Aug. 27, 2019 (7 pages).
Written Opinion of the International Searching Authority and International Search Report for PCT Application No. PCT/CN2018/117558 dated Aug. 28, 2019 (6 pages).
Written Opinion of the International Searching Authority and International Search Report for PCT Application No. PCT/CN2018/117560 dated Aug. 27, 2019 (7 pages).
Written Opinion of the International Searching Authority and International Search Report for PCT Application No. PCT/CN2018/117571 dated Aug. 27, 2019 (6 pages).
First Office Action for Chinese Application No. 201810887463.2 dated May 27, 2019 with English machine translation (10 pages).
Second Office Action for Chinese Application No. 201810887463.2 dated Sep. 29, 2019 with English machine translation (8 pages).
Written Opinion of the International Searching Authority and International Search Report for PCT Application No. PCT/US2019/045090 dated Oct. 16, 2019 (12 pages).
Gibson, "An investigation into Confidential Transactions," Jul. 12, 2018, retrieved from the internet: https://github.com/AdamISZ/ConfidentialTransactionsDoc/raw/master/essayonCT.pdf (22 pages).
Sun et al., "RingCT 2.0: A Compact Accumulator-Based (Linkable Ring Signature) Protocol for Blockchain Cryptocurrency Monero," International Conference on Computer Analysis of Images and Patterns, Aug. 12, 2017 (20 pages).
Bunz et al., "Bulletproofs: Short Proofs for Confidential Transactions and More," IEEE Symposium on Security and Privacy (SP), May 20, 2018 (20 pages).
First Search for Chinese Application No. 201810887463.2 dated May 14, 2019 (1 page).
Office Action for Korean Application No. 10-2019-7011447 dated Sep. 1, 2020.
Search Report for Taiwanese Application No. 108125043 dated May 4, 2020.
Search Report for Taiwanese Application No. 108125044 dated Aug. 19, 2020.
Search Report for Taiwanese Application No. 108110709 dated Apr. 24, 2020.
Notice of Allowance for Japanese Application No. 2019-520853 dated May 19, 2020.
Pedersen, T. P., "Non-Interactive and Information—Theoretic Secure Verifiable Secret Sharing", Advances in Cryptology—CRYPTO'91, Springer-Verlag, Aug. 1991.
Notice of Allowance for Korean Application No. 10-2019-7011443 dated Jun. 12, 2010.
Notice of Allowance for Japanese Application No. 2019-520982 dated Jun. 16, 2020.
Yoshihama et al., "Integrity and privacy protection in distributed ledger technology", Oct. 16, 2017, CSS 2017 Computer Securitry Symposium 2017. [English abstract provided].
Written Opinion for Singaporean Application No. 11201902778U dated May 26, 2020.
Tam LE et al., "CapChain: A Privacy Preserving Access Control Framework Based on Blockchain for Pervasive Environments". 2018 IEEE International Conference on Smart Computing Smartcomp, Jun. 20, 2018, pp. 57-64.
Office Action for Korean Application No. 10-2019-7011444 dated Jun. 2, 2020.
Alfred J. Menezes, Handbook of Applied Cryptography, CRC Press, 1996.
Written Opinion for Singaporean Application No. 11201903425P dated Jun. 2, 2020.
Friis, Digicash implementation. thesis, Jun. 4, 2003.
Written Opinion for Singaporean Application No. 11201903438T dated May 26, 2020.
Office Action for Korean Application No. 10-2019-7011446 dated Jun. 10, 2020.
Final Office Action for U.S. Appl. No. 16/738,055 dated Jul. 2, 2020.
Written Opinion for Singaporean Application No. 11201902773V dated Jun. 2, 2020.
Office Action for Canadian Application No. 3040611 dated Apr. 30, 2020.
Franca, Homomorphic Mini-blockchain Scheme, 2015) (Year: 2015).
Written Opinion for PCT Application No. PCT/US2019/045090 dated Mar. 11, 2020 (5 pages).
Examination Report No. 1 for Australian Application No. 2018322507 dated Feb. 5, 2020 (6 pages).
Poelstra A. et al,'Confidential assets' In: International Conference on Financial Cryptography and Data Security Feb. 26, 2018 (pp. 43-63). Springer, Berlin, Heidelberg.
Engelmann F . et al, 'Coloured Ring Confidential Transactions' In: Data Privacy Management, Cryptocurrencies and Blockchain Technology Sep. 6, 2018 (pp. 188-196). Springer, Cham.
Seguias Bek 'Monero's Building Blocks' [Retrieved from internet on Jan. 29, 2020] <URL: https://delfr.com/category/monero/> Jun. 18, 2018.
Search Report for European Application No. 18863802.7 dated Jan. 29, 2020 (5 pages).
Examination Report for European Application No. 18863802.7 dated Feb. 12, 2020 (6 pages).
Li Bin et al., "RZKPB: A Privacy-Preserving Blockchain-Based Fair Transaction Method for Sharing Economy," 2018 17th IEEE International Conference on Trust, Security, and Privacy in Computing and Communications, IEEE, Aug. 1, 2018 (6 pages).
Ian Miers et al., "Zerocoin: Anonymous Distributed E-Cash from Bitcoin," Security and Privacy, IEEE, May 19, 2013 (15 pages).
Examination Report No. 1 for Australian Application No. 2018327218 dated Feb. 6, 2020 (8 pages).
Search Report for European Application No. 18863790.4 dated Jan. 24, 2020 (8 pages).
Decision on Grant for Russian Application No. 2019111969 dated Feb. 12, 2020 (29 pages).
Examination Report No. 1 for Australian Application No. 2018347195 dated Feb. 4, 2020 (6 pages).
First Office Action for Canadian Application No. 3040357 dated Feb. 17, 2020 (6 pages).
Examination Report for European Application No. 18865370.3 dated Feb. 12, 2020 (8 pages).
Non-Final Office Action for U.S. Appl. No. 16/708,329 dated Mar. 19, 2020 (16 pages).
Maxwell (Greg Maxwell, "Confidential transactions", 2015, found at https://people.xiph.org/-greg/confidential_values.txt).
Examination Report for Eurpoean Application No. 18865369.5 dated Feb. 12, 2020 (5 pages).
Office Action and Search Report for Russian Application No. 2019111930 dated Feb. 13, 2020 (15 pages).

(56) References Cited

OTHER PUBLICATIONS

Jadhav H., Chandre P., Association rule mining methods for applying encryption techniques in transaction dataset, 2016 International Conference on Computer Communication and Informatics (ICCCI), Jan. 7-9, 2016, Coimbatore, India.
Office Action and Search Report for Russian Application No. 2019111926 dated Jan. 15, 2020 (19 pages).
Preinterview first office action for U.S. Appl. No. 16/709,770 dated Feb. 5, 2020.
First action interview—office action for U.S. Appl. No. 16/709,770 dated Mar. 12, 2020.
Office Action for Canadian Application No. 3040791 dated Mar. 2, 2020 (5 pages).
Examination Report for European Application No. 18865371.1 dated Feb. 12, 2020 (5 pages).
Decision on Grant for Russian Application No. 2019111929 dated Jan. 30, 2020 (26 pages).
Decision on Grant for Russian Application No. 2019111923 dated Mar. 23, 2020.
Notice of Allowance for U.S. Appl. No. 16/342,713 dated Apr. 2, 2020.
Notice of Allowance for U.S. Appl. No. 16/708,249 dated Apr. 8, 2020.
Notice of Allowance for U.S. Appl. No. 16/708,329 dated Apr. 8, 2020.
Office Action for Canadian Application No. 3037833 dated Apr. 28, 2020.
Office Action for Japanese Application No. 2019-521112 dated Apr. 7, 2020.
Office Action for Canadian Application No. 3040601 dated May 5, 2020.
Non-Final Office Action for U.S. Appl. No. 16/708,297 dated Feb. 5, 2021.
Non-Final Office Action for U.S. Appl. No. 16/342,605 dated Mar. 17, 2021.
Wikipedia entry for Elliptic Curve Diffie-Hellman archived by the Internet Archive on Jul. 17, 2018, https://web.archive.org/web/20180717235903/https://en.wikipedia.org/wiki/Elliptic-curve_Diffie%E2%80%93Hellman, retrieved on Mar. 12, 2021.
Non-Final Office Action for U.S. Appl. No. 16/738,055 dated Feb. 9, 2021.
Supplementary Search for Chinese Application No. 201810887463.2 dated Nov. 21, 2019 (1 page).
Third Office Action for Chinese Application No. 201810887463.2 dated Dec. 20, 2019 with English machine translatoin (7 pages).
Search Report for European Application No. 18865370.3 dated Jan. 21, 2020 (5 pages).
Shen, "Ring Confidential Transactions," Shen Noether-Monero Research Labs, Jan. 1, 2015 (34 pages).
Ma et al., "An Efficient NIZK Scheme for Privacy-Preserving Transactions over Account-Model Blockchain," Sep. 4, 2014 (12 pages).
First Examination Report for Australian Application No. 2018347196 dated Jan. 20, 2020 (3 pages).
Search Report for European Application No. 18865369.5 dated Jan. 24, 2020 (4 pages).
First Examination Report for Australian Application No. 2018347197 dated Jan. 20, 2020 (3 pages).
Search Report for European Application No. 18865371.1 dated Jan. 24, 2020 (4 pages).
Office Action for Japanese Application No. 2019-520859 dated Sep. 15, 2020.
Aganuma Ken et al.,"Decentralized netting protocol over Hyperledger Fabric", Abstracts of 2018 Symposium on Cryptography and Information Security (SCIS2018), The Institute of Electronics, Information and Communication Engineers, Jan. 23, 2018, p. 1-6, Refer specifically to "4.1 Channel Structure", "Appendix A:Pedersen commitment", [Appendix B:Malicious, Responding to . . . Nodes.
Andreas M. Antonopoulos, Mastering Bitcoin, NTT Publishing Co., Ltd., Jul. 21, 2016, First edition, pp. 20-21, ISBN 978-7571-0367-2, Refer specifically to "general transaction format".
Office Action for Japanese Application No. 2019-520976 dated Oct. 6, 2020.
Gertner et al., "Publicly-Verifiable SignCryption," Committing Encryption and Public-Verifiable SignCryption, Cryptology ePrint Archive, Dec. 16, 2003.
International Preliminary Report on Patentability for PCT/US2019/045090 dated Jul. 8, 2020.
First Examination Report for Indian Application No. 201947015708 dated Jul. 16, 2021.
Seguias, "Monero's Building Blocks Part 8 of 10—Introduction to Pedersen Commitments and Confidential Transactions," Apr. 24, 2018.
Written Opinion for Singaporean Application No. 10202006534U dated Jun. 8, 2021.
Notice of Allowance for U.S. Appl. No. 16/708,297 dated Apr. 23, 2021.
Billislioglu et al., "Robust Tracking Commitment," IEEE Transactions on Automatic Control, vol. 62, Issue: 9 I Journal Article I Publisher, IEEE, 2017.
Han et al., "Improving Privacy and Security in Decentralized Ciphertext-Policy Attribute-Based Encryption," IEEE Transactions on Information Forensics and Security, vol. 10, Issue: 3 I Journal Article I Publisher: IEEE, 2015.
Final Office Action for U.S. Appl. No. 16/342,605 dated Aug. 13, 2021.

* cited by examiner

```
┌─────────────────────────────────────────────────────────┐
│ Selecting one or more blockchain assets from a remitter's blockchain
│ account according to a transaction amount of a transaction to be
│ remitted from the remitter's blockchain account into a receiver's
│ blockchain account, where a total asset amount represented by the      ~ 102
│ selected one or more blockchain assets is not less than the
│ transaction amount, and a commitment of an individual asset
│ amount represented by each of the selected one or more blockchain
│ assets is recorded in the blockchain
└─────────────────────────────────────────────────────────┘
                                │
                                ▼
┌─────────────────────────────────────────────────────────┐
│         Generating a commitment of the transaction amount               ~ 104
└─────────────────────────────────────────────────────────┘
                                │
                                ▼
┌─────────────────────────────────────────────────────────┐
│ Submitting a transaction to the blockchain, where the transaction
│ may contain the information of the selected blockchain assets and
│ the commitment of the transaction amount, so that the selected
│ blockchain assets are removed from the remitter's blockchain           ~ 106
│ account after the transaction is implemented and blockchain assets
│ corresponding to the commitment of the transaction amount are
│ added to the receiver's blockchain account after the transaction is
│ implemented
└─────────────────────────────────────────────────────────┘
```

METHOD, APPARATUS AND ELECTRONIC DEVICE FOR BLOCKCHAIN TRANSACTIONS

CROSS REFERENCE TO RELATED APPLICATION

The present application is based on and claims priority to Chinese Patent Application No. 201810887463.2, filed on Aug. 6, 2018, which is incorporated herein by reference in its entirety.

TECHNICAL FIELD

One or more embodiments of the present specification relate to the technical field of blockchains, particularly to a method, apparatus, and electronic device for implementing blockchain-based transactions.

BACKGROUND ART

Blockchain nodes of a blockchain network may jointly maintain a unified blockchain ledger through a consensus reached among the blockchain nodes, to record data of transactions having occurred on the blockchain network. The blockchain ledger can be made public for viewing and verification of historical data of the occurred transactions at any time.

SUMMARY

One or more embodiments of the present specification provide a method, apparatus, and non-transitory computer-readable storage medium for implementing blockchain-based transactions.

According to a first aspect of one or more embodiments of the present specification, a method is provided for implementing blockchain-based transactions. The method may comprise: selecting one or more blockchain assets from a remitter's blockchain account according to a transaction amount of a transaction to be remitted from the remitter's blockchain account into a receiver's blockchain account, wherein a total asset amount represented by the selected one or more blockchain assets is not less than the transaction amount, and a commitment of an individual asset amount represented by each of the selected one or more blockchain assets is recorded in a blockchain; generating a commitment of the transaction amount; and submitting to the blockchain the transaction comprising information of the selected one or more blockchain assets and the commitment of the transaction amount, for the selected one or more blockchain assets to be removed from the remitter's blockchain account and one or more blockchain assets corresponding to the commitment of the transaction amount to be added to the receiver's blockchain account.

In some embodiments, the commitment of the transaction amount is obtained by applying an encryption algorithm to the transaction amount and a transaction random number, and wherein the computing device is associated with the remitter, and the method may further comprise: before submitting the transaction to the blockchain, sending the transaction random number to another computing device associated with the receiver via an off-chain channel for the computing device associated with the receiver to determine, according to the encryption algorithm and the transaction random number, a transaction asset amount represented by the one or more blockchain assets to be added to the receiver's blockchain account. In some embodiments, the encryption algorithm may be Pederson Commitment.

In some embodiments, before submitting the transaction to the blockchain, the method may further comprise: sending the commitment of the transaction amount to the computing device associated with the receiver via an off-chain channel for the computing device associated with the receiver to verify an association among the commitment of the transaction amount, the transaction random number, and the transaction amount.

In some embodiments, before submitting the transaction to the blockchain, the method may further comprise: obtaining a receiver signature generated by the computing device associated with the receiver based on a receiver private key after successfully verifying the association, wherein the receiver signature represents the receiver's endorsement for the commitment of the transaction amount; and adding the receiver signature to the transaction for blockchain nodes in the blockchain to verify the receiver signature.

In some embodiments, the method may further comprise: generating a remitter signature related to the commitment of the transaction amount via a remitter private key; and adding the remitter signature to the transaction for blockchain nodes in the blockchain to verify the remitter signature.

In some embodiments, the method may further comprise: generating a range proof, wherein the range proof is related to the transaction amount; and adding the range proof to the transaction.

In some embodiments, before submitting the transaction to the blockchain, the method may further comprise: generating a commitment of a change amount in response to the total asset amount represented by the selected one or more blockchain assets being more than the transaction amount, wherein the change amount is a difference between the total asset amount of the selected one or more blockchain assets and the transaction amount; and adding the commitment of the change amount to the transaction, for one or more blockchain assets corresponding to the commitment of the change amount to be credited back to the remitter's blockchain account.

In some embodiments, the commitment of the individual asset amount ($M_i$) is obtained by applying a homomorphic encryption algorithm to the individual asset amount ($p_i$) and an asset random number ($r_i$), wherein $0 < i \leq k$ and k is the number of the selected one or more blockchain assets; the commitment of the transaction amount (T) is obtained by applying the homomorphic encryption algorithm to the transaction amount (t) and a transaction random number (r); the commitment of the change amount (T0) is obtained by applying the homomorphic encryption algorithm to the change amount (t0) and a change random number (r0); and before submitting the transaction to the blockchain, the method may further comprise: generating a verification random number (r'), wherein $r' = r1 + \ldots + rk - r - r0$; and adding the verification random number (r') to the transaction for blockchain nodes in the blockchain to verify whether an input of the transaction is equal to an output of the transaction.

In some embodiments, the input of the transaction is verified to be equal to the output of the transaction in response to a verification commitment (R') corresponding to the verification random number r' is equal to $M1 + \ldots + Mk - T - T0$.

In some embodiments, the commitment of the change amount is obtained by applying the homomorphic encryption algorithm to the change amount and a change random number.

In some embodiments, before submitting the transaction to the blockchain, the method may further comprise: generating a range proof, wherein the range proof is related to the change amount; and adding the range proof to the transaction.

According to a second aspect of one or more embodiments of the present specification, an apparatus is provided for implementing blockchain-based transactions. The apparatus may comprise: one or more processors and one or more non-transitory computer-readable memories coupled to the one or more processors and configured with instructions executable by the one or more processors to cause the apparatus to perform operations comprising: selecting one or more blockchain assets from a remitter's blockchain account according to a transaction amount of a transaction to be remitted from the remitter's blockchain account into a receiver's blockchain account, wherein a total asset amount represented by the selected one or more blockchain assets is not less than the transaction amount, and a commitment of an individual asset amount represented by each of the selected one or more blockchain assets is recorded in a blockchain; generating a commitment of the transaction amount; and submitting to the blockchain the transaction comprising information of the selected one or more blockchain assets and the commitment of the transaction amount, for the selected one or more blockchain assets to be removed from the remitter's blockchain account and one or more blockchain assets corresponding to the commitment of the transaction amount to be added to the receiver's blockchain account.

According to a third aspect of one or more embodiments of the present specification, a non-transitory computer-readable storage medium is provided. The non-transitory computer-readable storage medium configured with instructions executable by one or more processors to cause the one or more processors to perform operations comprising: selecting one or more blockchain assets from a remitter's blockchain account according to a transaction amount of a transaction to be remitted from the remitter's blockchain account into a receiver's blockchain account, wherein a total asset amount represented by the selected one or more blockchain assets is not less than the transaction amount, and a commitment of an individual asset amount represented by each of the selected one or more blockchain assets is recorded in a blockchain; generating a commitment of the transaction amount; and submitting to the blockchain the transaction comprising information of the selected one or more blockchain assets and the commitment of the transaction amount, for the selected one or more blockchain assets to be removed from the remitter's blockchain account and one or more blockchain assets corresponding to the commitment of the transaction amount to be added to the receiver's blockchain account.

DETAILED DESCRIPTION

Embodiments will be described in detail, with examples shown in the accompanying drawings. When the description below involves the accompanying drawings, unless otherwise indicated, the same numeral in different accompanying drawings stands for the same element or similar elements. The implementation manners described in the following embodiments do not represent all the implementation manners consistent with the present specification. Rather, they are only examples of the apparatuses and methods described in detail in the attached claims and consistent with some aspects of one or more embodiments of the present specification.

In some embodiments, it is not necessary to perform steps in the methods according to the sequence illustrated and described in the present specification. In some other embodiments, the steps of the methods may be more or less than those described in the present specification. Further, a single step described in the present specification may be split into multiple steps for description in other embodiments, while multiple steps described in the present specification may be merged into one single step for description in yet other embodiments.

Figure 1:
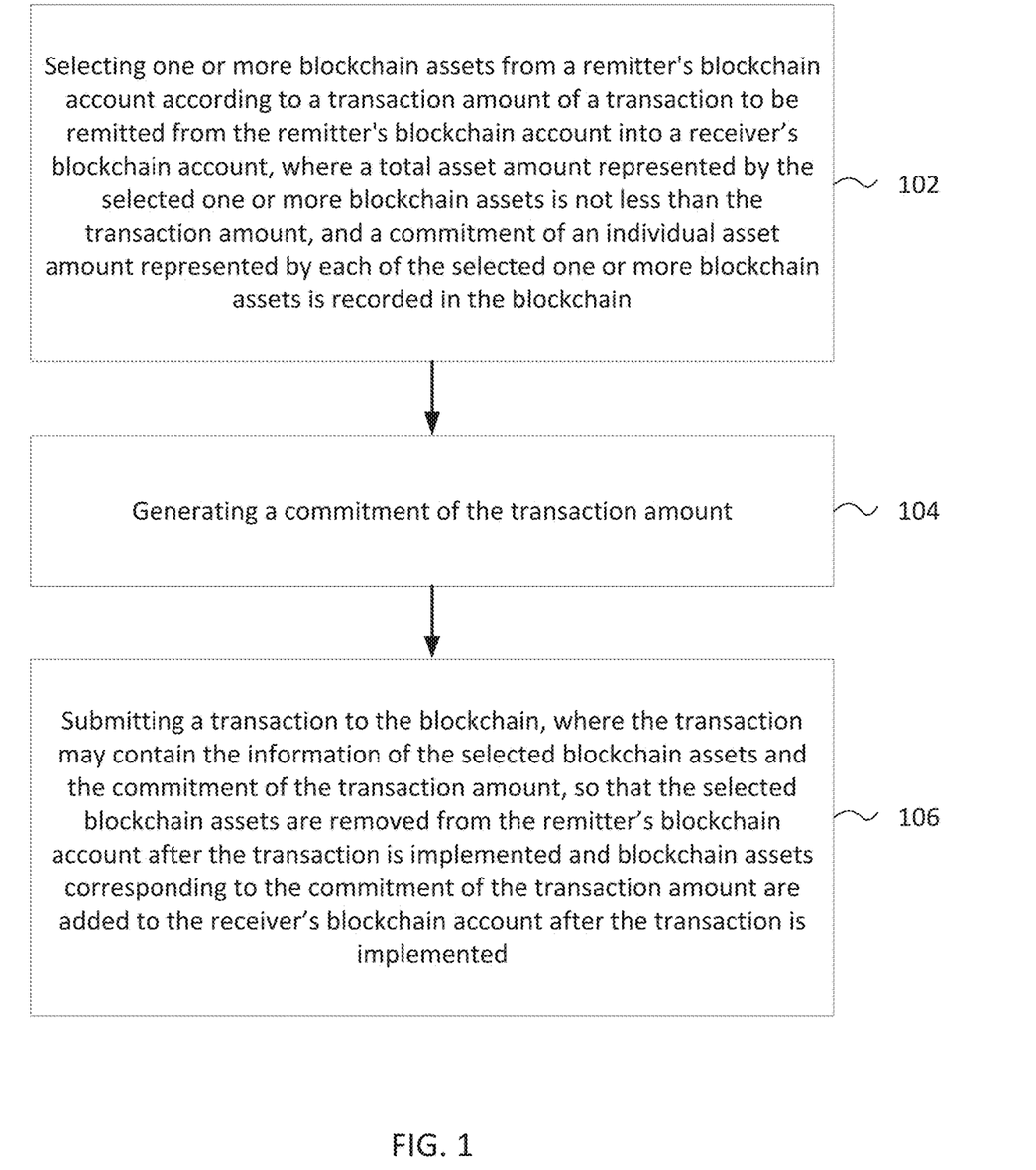
FIG. 1 is a flow chart of a method for implementing blockchain-based transactions according to some embodiments of the specification.

FIG. 1 is a flow chart of a method for implementing blockchain-based transactions according to some embodiments of the specification. As shown in FIG. 1, this method is implementable by one or more computing devices as one or more remitter devices and may comprise the following steps 102-106.

A remitter device refers to a computing device associated with a remitter who remits money to a receiver through one or more transactions. A receiver device refers to a computing device associated with a receiver who receives money from a remitter through one or more transactions. The computing device may be a personal computer, a laptop computer, a cell phone, a camera phone, a smart phone, a PDA (personal digital assistant), a media player, a navigation device, an email sending and receiving device, a game console, a tablet computer, a wearable device or any combination of a few of these devices.

Step 102, selecting one or more blockchain assets from a remitter's blockchain account according to a transaction amount of a transaction to be remitted from the remitter's blockchain account into a receiver's blockchain account, where a total asset amount represented by the selected one or more blockchain assets is not less than the transaction amount, and a commitment of an individual asset amount represented by each of the selected one or more blockchain assets is recorded in the blockchain.

In some embodiments, an "account balance" in a blockchain account may include one or more types of blockchain assets that may be applied respectively in different transactions. In one embodiment, the blockchain account may participate in multiple transactions in parallel, which significantly improves the transaction efficiency for blockchain-based transactions. For example, assuming that a remitter's blockchain account simultaneously contains blockchain assets 1-5, blockchain assets 1-3 may be tapped in transaction 1, while blockchain assets 4-5 may be tapped in transaction 2. Transactions 1 and 2 may be executed at the same time, instead of in sequence.

In some embodiments, a blockchain account contains multiple blockchain assets which are added respectively to the blockchain account via transactions, and the transactions may be executed by the owner of the blockchain account or any other user.

In some embodiments, a blockchain account may not actively combine blockchain assets or split a blockchain asset, while the owner may actively combine blockchain assets or split a blockchain asset in the blockchain account.

In some embodiments, the blockchain nodes in a blockchain may respectively maintain unified blockchain ledgers based on a consensus. Information of the blockchain assets contained in the blockchain accounts (for example, the foregoing remitter's blockchain accounts and the receiver's blockchain accounts) is recorded in the blockchain ledgers. In some embodiments, the blockchain ledgers record a commitment of an individual asset amount corresponding to each of the blockchain assets, and may not record the individual asset amount in order to keep the balances of the corresponding blockchain accounts confidential.

In some embodiments, each blockchain asset may comprise an asset certificate. The asset certificate may correspond to a token, a digital asset, or any other intelligent asset in a blockchain. Alternatively, the asset certificate may correspond to cash, security, a discount coupon, a real estate, and any other asset not in the blockchain.

Step 104, generating a commitment of the transaction amount.

In some embodiments, generating a commitment of the transaction amount allows the blockchain ledgers to record the commitment of the transaction amount but not to record the transaction amount, so that the transaction amount is kept confidential in the course of transaction.

Step 106, submitting a transaction to the blockchain, where the transaction may contain the information of the selected blockchain assets and the commitment of the transaction amount, so that the selected blockchain assets are removed from the remitter's blockchain account after the transaction is implemented and blockchain assets corresponding to the commitment of the transaction amount are added to the receiver's blockchain account after the transaction is implemented.

In some embodiments, the commitment of the transaction amount may be calculated by a predetermined encryption algorithm according to the transaction amount and a transaction random number. A transaction random number may refer to a random number used to generate a commitment of the transaction amount based on an encryption algorithm, such as a homomorphic encryption algorithm. Correspondingly, a remitter device may send the transaction random number to a receiver device via an off-chain channel so that the receiver device can determine a transaction asset amount represented by the one or more blockchain assets to add to the receiver's blockchain account according to the predetermined encryption algorithm and the transaction random number. Transmitting the transaction random number via an off-chain channel may avoid the transaction random number being recorded in the blockchain ledgers, ensuring that the transaction amount is kept confidential. After the blockchain executes the transaction, the receiver device may decrypt the encrypted transaction asset amount (e.g., the commitment of the transaction amount) based on the transaction random number to obtain the transaction asset amount of the blockchain assets added to the receiver's blockchain account and optionally apply the blockchain assets added to the receiver's blockchain account in a subsequent transaction process.

In some embodiments, a remitter device may send the commitment of the transaction amount to a receiver device via an off-chain channel before submitting the transaction to the blockchain so that the receiver device verifies an association among the commitment of the transaction amount, the transaction random number, and the transaction amount. A receiver device may allow implementation of the transaction after successful verification, otherwise may stop the implementation of the transaction. For example, a receiver device may provide a receiver signature after successful verification; otherwise may not provide this receiver signature.

In some embodiments, a remitter device may obtain a receiver signature. The receiver signature is generated by a receiver device based on a receiver private key and is related to the commitment of the transaction amount. The receiver signature may represent receiver device's endorsement for the commitment of the transaction amount. In some embodiments, the receiver signature is generated by the receiver device after the above-described association has been verified; the receiver signature is then added to the transaction so that the blockchain nodes in the blockchain can verify the receiver signature. For example, when a transaction does not contain the receiver signature, the blockchain nodes may determine that consensus fails, thereby refusing to proceed with the transaction.

In some embodiments, a remitter device may generate a remitter signature related to the commitment of the transaction amount via a remitter private key, and add the remitter signature to the transaction so that the blockchain nodes in the blockchain can verify the remitter signature. For example, when a transaction does not contain the remitter signature, the blockchain nodes may determine that consensus fails, thereby refusing to proceed with the transaction.

In some embodiments, a remitter device may generate a range proof, wherein the range proof is related to the transaction random number, the transaction amount, and the commitment of the transaction amount, and add the range proof to the transaction, so that the blockchain nodes in the blockchain can verify whether the transaction amount is not less than zero. A range proof is a form of commitment validation that enables verifying that a commitment represents an amount within a specified range, without revealing the amount. For example, the range proof related to the transaction random number, the transaction amount, and the commitment of the transaction amount may enable verifying that the commitment represents the transaction amount which is not less than zero. For instance, range proof technologies such as a Bulletproofs solution or a Borromean ring signature solution may be used. Those of ordinary skill in the art should also appreciate that other example of range proof technologies may be applied.

In some embodiments, the asset amount represented by the selected blockchain assets may be equal to or greater than the transaction amount. When the asset amount is equal to the transaction amount, the selected blockchain assets may be removed from the remitter's blockchain account after the transaction is implemented, and the blockchain assets corresponding to the commitment of the transaction amount may be added to the receiver's blockchain account after the transaction is implemented.

In some embodiments, when the asset amount is more than the transaction amount, the selected blockchain assets may similarly be removed from the remitter's blockchain account after the transaction is implemented. In some embodiments, a change amount (e.g., a difference between the asset amount and the transaction amount) may be credited back to the remitter's blockchain account. The blockchain assets corresponding to the commitment of the transaction amount may be added to the receiver's blockchain account after the transaction is implemented.

In some embodiments, a remitter device may generate a commitment of a change amount when the asset amount represented by the selected blockchain assets is more than the transaction amount. The change amount is the difference between the asset amount represented by the selected blockchain assets and the transaction amount. In addition, the remitter device may add the commitment of the change amount to the transaction so that the blockchain assets corresponding to the commitment of the change amount are added to the remitter's blockchain account after the transaction is implemented, thereby ensuring that the remitted amount of the blockchain assets is equal to the received amount.

In some embodiments, a commitment of an individual asset amount Mi is obtained by applying a homomorphic encryption algorithm to the asset amount pi represented by a selected blockchain asset Pi and an asset random number ri, where $0<i \leq k$ and k is the number of the selected blockchain assets. The commitment of the transaction amount T is obtained by applying the homomorphic encryption algorithm to the transaction amount t and the transaction random number r, and the commitment of the change amount T0 is obtained by applying the homomorphic encryption algorithm to the change amount t0 and the change random number r0. A remitter device may generate a verification random number r', where r'=r1+ . . . +rk−r−r0; and add the verification random number r' in the transaction so that the blockchain nodes in the blockchain can verify whether the input of the transaction is equal to the output of the transaction. In some embodiments, the input of the transaction is verified to be equal to the output of the transaction when the verification commitment R', to which the verification random number r' corresponds, satisfies the equation: R'=M1+ . . . +Mk−T−T0.

In some embodiments, any type of homomorphic encryption algorithm may be used to obtain the above-described commitments. For example, any homomorphic encryption algorithm satisfying additive homomorphism and supporting a proof that a piece of plaintext data belongs to a range may be used. Therefore, the blockchain nodes can conduct subtraction and addition to the ciphertext encrypted by homomorphic encryption, determine R'=M1+ . . . +Mk−T−T0 according to r'=r1+ . . . +rk−r−r0, and also provide a proof regarding the ciphertext to prove that the transaction amount is not less than zero and not more than the total amount of the assets in the transaction. In some examples, the homomorphic encryption algorithm may be an additively homomorphic encryption algorithm or a fully homomorphic encryption algorithm. For example, the homomorphic encryption algorithm may be a Pedersen commitment mechanism. The present specification has no limitation to this.

In some embodiments, the commitment of the change amount is calculated by a homomorphic encryption algorithm according to the change amount and a change random number. A remitter device may generate a range proof related to the change random number, the change amount, and the commitment of the change amount. For example, the range proof may enable proving that the commitment represents the change amount which is not less than zero. The remitter device may add the range proof to the transaction, so that the blockchain nodes in the blockchain can verify whether the change amount is not less than zero. For instance, range proof technologies such as a Bulletproofs solution or a Borromean ring signature solution may be used. Those of ordinary skill in the art should also appreciate that other example of range proof technologies may be applied.

In some embodiments, another range proof may be related to all of the transaction random number, the transaction amount, the commitment of the transaction amount, the change random number, the change amount, and the commitment of the change amount. The range proof may enable verifying that the commitment of the transaction amount represents the transaction amount which is not less than zero, and that the commitment of the change amount represents the change amount which is not less than zero. A remitter device may add the range proof to the transaction, so that the blockchain nodes can verify based on the range proof whether both the transaction amount and the change amount are not less than zero.

In some embodiments, after blockchain nodes receive the foregoing transaction, the blockchain nodes may use double-spending prevention mechanism or replay attack prevention mechanism to verify if this transaction has been executed. If this transaction has been executed, another execution of this transaction may be rejected.

Figure 2:
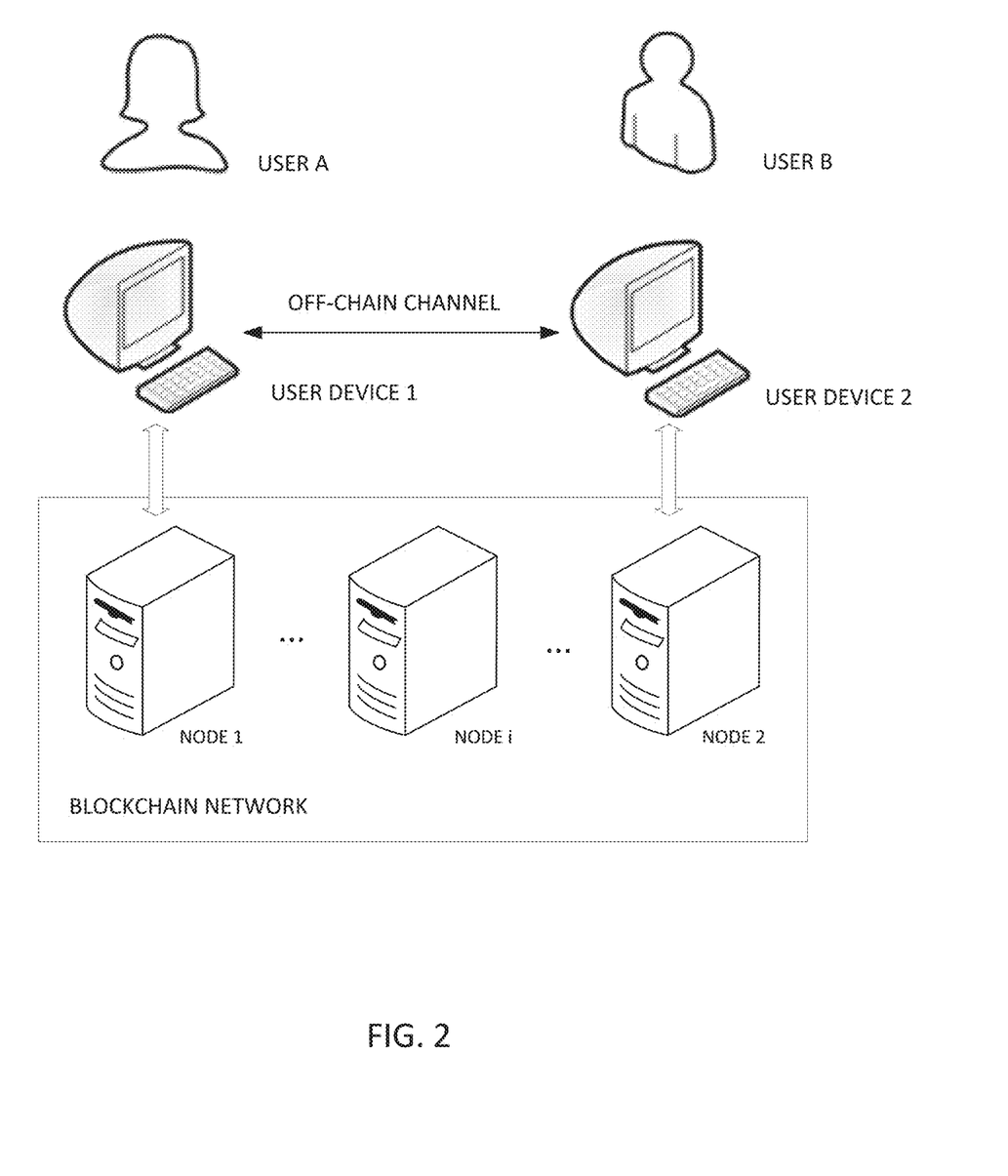
FIG. 2 is a schematic diagram of an implementation of a remittance transaction in a blockchain network according to some embodiments of the specification.

For easier understanding, a remittance transaction in a blockchain network is taken below as an example to describe the technical solutions of the present specification in detail. FIG. 2 is a schematic diagram of implementation of a remittance transaction in a blockchain network according to some embodiments of the specification. As shown in FIG. 2, it is assumed that a user A conducts blockchain remittance to a user B. A "user" in the present specification may be manifested as a login user account, while this user account may belong to an individual or an organization.

It is assumed that a remitter device used by the user A is a user device 1. For instance, a user account corresponding to the user A is logged in on this user device 1. Similarly, a receiver device used by the user B is a user device 2. An off-chain channel may be established between the user device 1 and the user device 2 to achieve corresponding off-chain communications.

A client program of blockchain may be executed on the user device 1 so that the user device 1 corresponds to blockchain node in the blockchain network, such as the node 1 shown in FIG. 2. Similarly, a client program of blockchain may be run on the user device 2 so that the user device 2 also corresponds to a corresponding blockchain node in the blockchain network, such as the node 2 shown in FIG. 2. The blockchain network also includes other blockchain nodes, such as the node k shown in FIG. 2. The blockchain nodes are not enumerated here. Through the foregoing node 1, node 2, etc., the remittance transaction between the user A and the user B may be implemented via the blockchain network, and related transaction information may be recorded in the blockchain ledgers maintained by the blockchain nodes respectively, thereby preventing the recorded transaction information from being tampered with, and also facilitating subsequent inspection.

Figure 3:
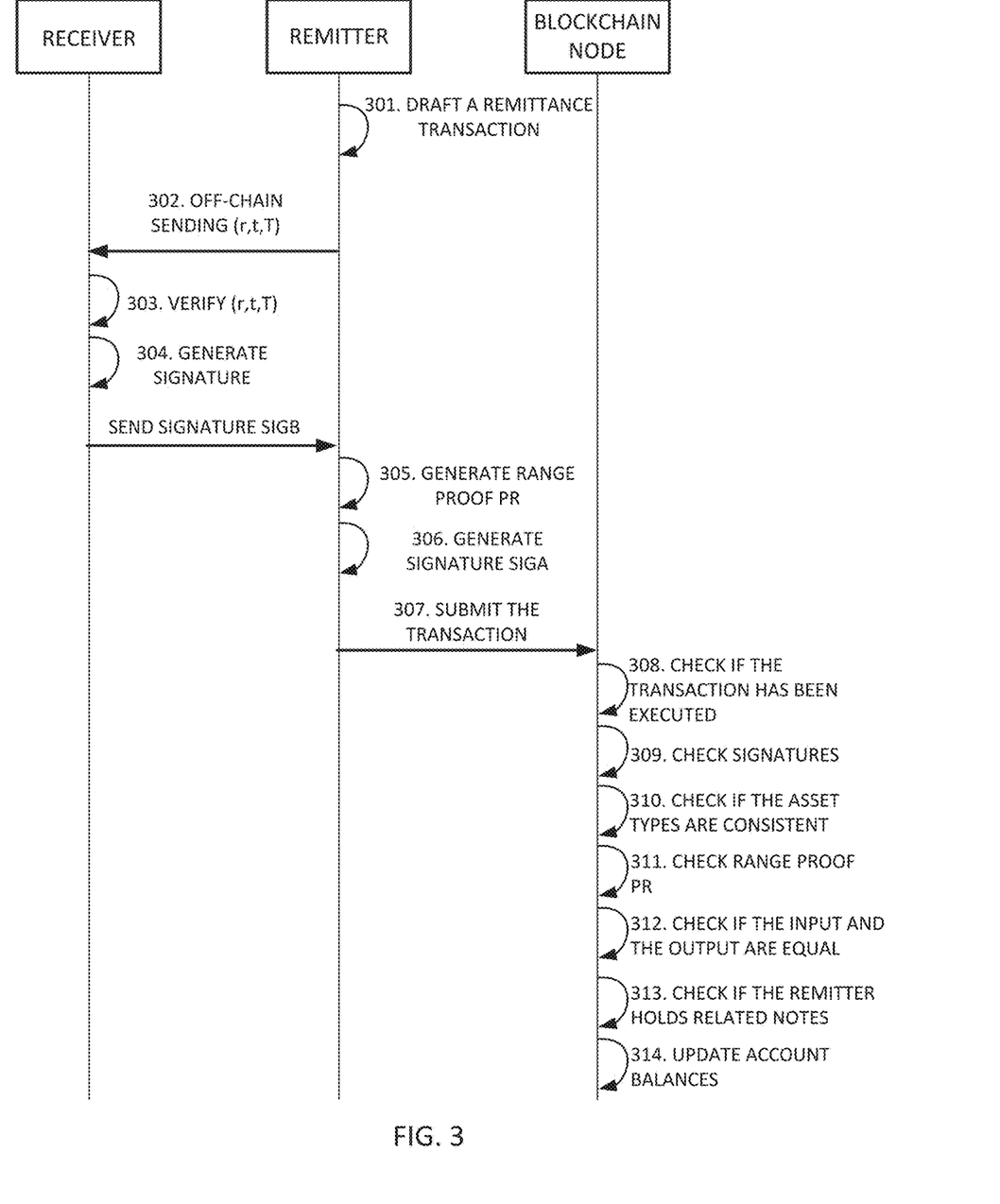
FIG. 3 is a flow chart of an implementation of a remittance transaction in a blockchain network according to some embodiments of the specification.

With respect to the scenario of the remittance transaction shown in FIG. 2, FIG. 3 is a flow chart of implementation of a remittance transaction in a blockchain network according to some embodiments of the specification. As shown in FIG. 3, the process of interaction among the remitter, receiver, and blockchain nodes may comprise the following steps 301-311.

Step 301, the remitter drafts a remittance transaction.

In some embodiments, a remitter may refer to an individual or entity that remits a fund and other resources in a remittance transaction; correspondingly, a receiver may refer to an individual or entity that receives a fund and/or other resources in a remittance transaction. For example, in the embodiments shown in FIG. 2, the user device 1 may be configured to be the remitter, while the user device 2 may be configured to be the receiver.

In some embodiments, when drafting a remittance transaction, the remitter may negotiate a to-be-remitted amount t with the receiver. The remitter may select k notes P1~pk from the blockchain account 1 corresponding to a user A. A "note" refers to a blockchain asset of certain an asset amount. Each blockchain account in the present specification may contain multiple notes. Note information of each note in the blockchain account may include a NoteType field, a NoteID field, and a field of a commitment of an asset amount. The NoteType field stands for an asset type of the corresponding note, the NoteID field stands for an unique identification of the corresponding note, and the field of the commitment of the asset amount stands for the commitment of the asset amount generated based on the asset amount of the note via a Pedersen commitment mechanism, etc.

In some embodiments, the transaction model used in the present specification may include a transaction address TxID field, a signature field, an input field, and an output field. For example, the TxID field is a hash value of transaction content, the signature field includes a remitter's signature and a receiver's signature, the input field includes an account address of the remitter's blockchain account corresponding to the remitter and a list of selected notes in the remitter's blockchain account, and the output field includes an output information list. For example, the list contains multiple items arranged in sequence, where each item has a corresponding serial number Index, and each item includes: an account address of the receiver's blockchain account, a type of an asset to be received and a commitment of an asset amount to be received; the "receiver" may be the party in the remittance operation for receiving the blockchain asset corresponding to a to-be-remitted amount or a change that is associated with the to-be-remitted amount. For example, the remitter may also simultaneously be "receiver" for receiving the blockchain asset corresponding to a change amount. In the NoteID field corresponding to the foregoing note, the value of NoteID may be calculated by adding the address TxID of the transaction generating the note and a corresponding serial number Index of the note in the output information list of the transaction.

In some embodiments, according to the asset type of the to-be-remitted amount t, the remitter may select a number of notes of the same asset type from the remitter's blockchain account and ensure that the sum of the asset amounts represented by the selected notes is not less than the to-be-remitted amount t. If the notes of the same asset type are not sufficient to complete the remittance, the remitter may abandon the remittance, or may use the notes of other asset types for the remittance according to an exchange rate. For easier understanding, the terms involving the amount of assets, such as asset amount, refer to the value after conversion according to a corresponding exchange rate hereinafter.

In some embodiments, it is assumed that the asset amounts corresponding to notes P1~pk are p1~pk, and notes P1~pk correspond to asset random numbers r1~rk respectively. The asset amounts p1~pk and the asset random numbers r1~rk may be used to generate corresponding commitments of the asset amounts M1~mk respectively according to homomorphic encryption based on a Pedersen commitment mechanism, etc., where Mi=Comm(ri, pi)=ri× G+pi×H, and G and H are known functions (such as a generator for randomly generating elliptic curves).

In some embodiments, a user device 1 may read the commitments of the asset amounts M1~mk corresponding to the notes P1~pk respectively from the blockchain ledger maintained by a node 1, and decrypt the commitments of the asset amounts M1~mk to obtain corresponding asset amounts p1~pk, based on the asset random numbers r1~rk corresponding to the notes P1~pk, respectively, which are known to the user device 1, so as to ensure p1+p2+ . . . +pk≥to-be-remitted amount t. In addition, the user device 1 may also calculate the change amount t0=p1+p2+ . . . +pk−t.

In some embodiments, the user device 1 may generate a transaction random number r for the to-be-remitted amount t, and a change random number r0 for the change amount t0, and conduct homomorphic encryption to the to-be-remitted amount t and the transaction random number r based on a Pedersen commitment mechanism, etc., to obtain a commitment of the to-be-remitted amount T=Comm(r, t), and conduct homomorphic encryption to the change amount t0 and the change random number r0 to obtain a commitment of the change amount T0=Comm(r0, t0).

Step 302, the remitter sends (r, t, T) to a receiver via an off-chain channel.

In some embodiments, sending (r, t, T) via an off-chain channel rather than a blockchain network may avoid recording the transaction random number r and the to-be-remitted amount t in a blockchain ledger, and ensure that the to-be-remitted amount t is unknown except to the remitter and the receiver.

Step 303, the receiver verifies the received (r, t, T).

In some embodiments, the receiver may verify the to-be-remitted amount t to determine that it is the negotiated to-be-remitted amount. In some embodiments, when the to-be-remitted amount t is correct, the receiver may verify the commitment of the to-be-remitted amount T; in other words, the receiver may calculate the transaction random number r and the to-be-remitted amount t via the encryption algorithm based on a Pedersen commitment mechanism to verify if the commitment of the to-be-remitted amount T=Comm(r, t) is correct. If yes, the verification is passed. If not, the verification is not passed.

Step 304, after the verification is passed, a signature SIGB is generated and returned to the remitter.

In some embodiments, after the verification is passed, the receiver may use a receiver private key to sign (A, B, T), generate a signature SIGB and return the signature to the remitter. This signature SIGB indicates that the receiver agrees to the remittance transaction with a commitment T implemented from the blockchain account 1 of the user A to the blockchain account 2 of user B.

Step 305, after receiving the signature SIGB, the remitter generates a range proof PR.

In some embodiments, in order to ensure that a remittance transaction is completed smoothly, blockchain nodes may determine that the remittance transaction meets the following conditions: t≥0 and t0≥0. In some embodiments, range proof technologies enable the blockchain nodes to verify the range proof PR in a ciphertext state to determine whether the remittance transaction meets the foregoing conditions. For example, range proof technologies such as a Bulletproofs solution or a Borromean ring signature solution may be used. Those of ordinary skill in the art should also appreciate that other example of range proof technologies may be applied.

In some embodiments, the remitter may use a range proof technology to generate a range proof PR related to (r0, t0, T0, r, t, T) to enable the blockchain nodes to verify whether t≥0 and t0≥0 in the subsequent process.

Step 306, the remitter generates a signature SIGA.

In some embodiments, the remitter may use a remitter private key to sign (A:P1,P2, . . . ,Pk;A:T0;B:T;PR,r') and generate a signature SIGA, where r'=r1+ . . . +rk−r−r0.

Step 307, the remitter submits the transaction to the blockchain.

In some embodiments, the remitter submits a corresponding remittance transaction (A:P1,P2, . . . ,Pk;A:T0;B:T;PR, r';SIGA,SIGB) to the blockchain via a node 1 to execute this remittance transaction. The remittance transaction (A:P1, P2, . . . ,Pk;A:T0;B:T;PR,r';SIGA,SIGB) may be transmitted to all the blockchain nodes in the blockchain network and all the blockchain nodes may verify this remittance transaction (A:P1,P2, . . . ,Pk;A:T0;B:T;PR,r';SIGA,SIGB) respectively to execute the remittance operation when the verification is passed, or to refuse the remittance when the verification is not passed.

Step 308, the blockchain nodes check if the transaction has been executed.

In some embodiments, the blockchain nodes may be any blockchain nodes in a blockchain network. In other words, every blockchain node in the blockchain network may receive the remittance transaction (A:P1,P2, . . . ,Pk;A:T0; B:T;PR,r';SIGA,SIGB), and perform verification and other operations through Steps 308-313.

In some embodiments, after the blockchain nodes receive the remittance transaction (A:P1,P2, . . . ,Pk;A:T0;B:T;PR, r';SIGA,SIGB), the blockchain nodes may use the double-spending prevention mechanism or replay attack prevention mechanism to verify if this remittance transaction has been executed. If this remittance transaction has been executed, another execution of the remittance transaction (A,B,T; SIGA,SIGB;PR) may be rejected, otherwise the process proceeds to Step 309.

Step 309, the blockchain nodes check signatures.

In some embodiments, the blockchain nodes may check if signatures SIGA and SIGB contained in the remittance transaction (A:P1,P2, . . . ,Pk;A:T0;B:T;PR,r';SIGA,SIGB) are correct. If the signatures are not correct, the execution of this remittance transaction (A:P1,P2, . . . ,Pk;A:T0;B:T;PR, r';SIGA,SIGB) may be rejected, otherwise the process proceeds to Step 310.

Step 310, the blockchain nodes check if the asset types are consistent.

In some embodiments, the blockchain nodes check the NoteType fields of the notes P1~pk to determine the asset types of the blockchain assets represented by the notes P1~pk; when the asset types corresponding to P1~pk are inconsistent with the designated remittance types (the asset types used by the to-be-remitted amounts), the execution of this remittance transaction (A:P1,P2, . . . ,Pk;A:T0;B:T;PR, r';SIGA,SIGB) may be rejected, otherwise the process proceeds to Step 311.

In other embodiments, even if the asset types are inconsistent, as long as the remitter has converted the asset amounts represented by the notes according to the relevant exchange rate when calculating T0, PR, r', and other parameters, then Step 310 may be skipped.

Step 311, the blockchain nodes the check range proof PR.

In some embodiments, the blockchain nodes may, based on a range proof technology, check the range proof PR contained in the remittance transaction (A:P1,P2, . . . ,Pk; A:T0;B:T;PR,r';SIGA,SIGB) to determine whether the conditions of t≥0 and t0≥0 are met. If the conditions are not met, the execution of this remittance transaction (A:P1, P2, . . . ,Pk;A:T0;B:T;PR,r';SIGA,SIGB) may be rejected; otherwise the process proceeds to Step 312.

Step 312, the blockchain nodes check if the input and the output are equal.

In some embodiments, because r'=r1+ . . . +rk−r−r0, then according to the characteristics of the homomorphic encryption mechanism, the asset amount corresponding to r' is t'=p1+ . . . +pk−t−t0; since the input of the remittance transaction is the sum of the asset amounts p1~pk corresponding to the selected notes P1~Pk, namely p1+ . . . +pk, and the output is the sum of the to-be-remitted amount and the change amount, namely t+t0, then the condition of p1+ . . . +pk=t+t0 is met when the input is equal to the output, enabling t'=p1+ . . . +pk−t−t0=0. Therefore, the commitment corresponding to r' is Comm(r', t')=r'×G+t'× H=r'G. According to r'=r1+ . . . +rk−r−r0, the blockchain nodes may verify whether r'G is equal to M1+ . . . +Mk−T−T0 corresponding to r1+ . . . +rk−r−r0 to determine whether the input is equal to the output; it is determined that the input is equal to the output when r'G=M1+ . . . +Mk−T−T0; otherwise the input and output are not equal.

Step 313, the blockchain nodes check if the remitter holds related notes.

In some embodiments, the blockchain nodes may determine whether the notes selected and designated in the transaction are included in the remitter's blockchain account according to the information related to the remitter's blockchain account (for example, the blockchain account corresponding to the user A) recorded in the maintained blockchain ledgers. If the notes are included, it is determined that the remitter holds the related notes; otherwise the remitter does not hold the notes.

Step 314, in the maintained blockchain ledgers, the blockchain nodes update the balances in the blockchain accounts to which the user A and the user B correspond respectively.

In some embodiments, it is assumed that the user A corresponds to the blockchain account 1 and the user B corresponds to the blockchain account 2; after the verification in Steps 308-313 is passed, the blockchain nodes may update the notes held by the blockchain account 1 and the blockchain account 2 in the maintained blockchain ledgers respectively: deleting notes P1~pk input in the transaction from and crediting back a note corresponding to the commitment of the change amount T0 to the blockchain account 1, and adding a note corresponding to the commitment of the to-be-remitted amount T to the blockchain account 2.

Based on the properties of homomorphic encryption algorithms, due to the commitment of the change amount T0=Comm(r0,t0) and because the user device 1 knows r0 and can learn that the commitment of a new note from the blockchain ledger maintained by the node 1 is T0, the asset amount represented by the note can be decrypted to obtain t0. Similarly, because the commitment of the to-be-remitted amount T=Comm(r, t) and the user device 2 obtains the transaction random number r notified by the remitter in Step 302 and can learn that the commitment of a new note from the blockchain ledger maintained by the node 2 is T, therefore the asset amount represented by the note may be decrypted to obtain t.

To sum up, the adoption of the account model based on a note mechanism allows the same blockchain account to contain multiple notes that can be used in multiple parallel remittance transactions respectively, thereby significantly improving transaction efficiency. At the same time, the use of the homomorphic encryption mechanism allows the encryption of the asset amount represented by the notes contained in the blockchain accounts. After encryption of the asset amount, the commitment of the asset amount may be recorded in blockchain ledgers. The to-be-remitted amount, the change amount, etc., can also be encrypted in remittance transactions, and the commitment of the to-be-remitted amount and commitment of the change amount can then be used in the implementation of remittance transactions. Therefore, the remittance transactions can be successfully implemented via the blockchain network, while keeping the account balance, the remitted balance and the change amount confidential, without affecting the blockchain nodes' verification of transaction conditions, and enabling the blockchain network to have a privacy protection function.

Figure 4:
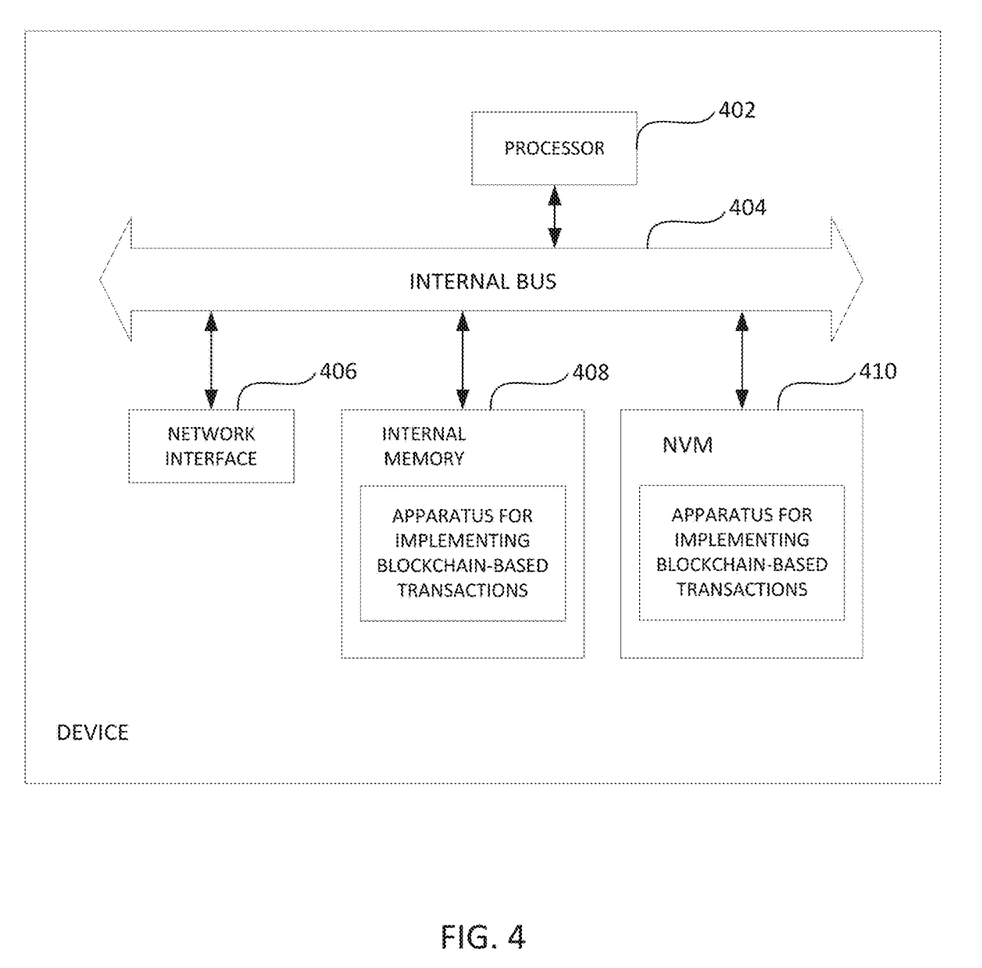
FIG. 4 is a schematic structural diagram of a device for implementing blockchain-based transactions according to some embodiments of the specification.

FIG. 4 is a schematic structural diagram of a device according to some embodiments of the specification. As shown in FIG. 4, at the hardware level, the device comprises a processor 402, an internal bus 404, a network interface 406, an internal memory 408 and a nonvolatile memory (NVM) 410. In some embodiments, the device may further comprise other pieces of hardware for transactions. In some embodiments, the processor 402 reads a corresponding computer program from the NVM 410 to the internal memory 408 and then executes the computer program to form a terminal interaction apparatus at a logical level. In addition to the software implementation manner, one or more embodiments of the present specification do not exclude other implementation manners, such as a logic device or a combination of software and hardware. That is, the executive bodies of the following processing flow are not limited to logical units and may be hardware or logic devices.

Figure 5:
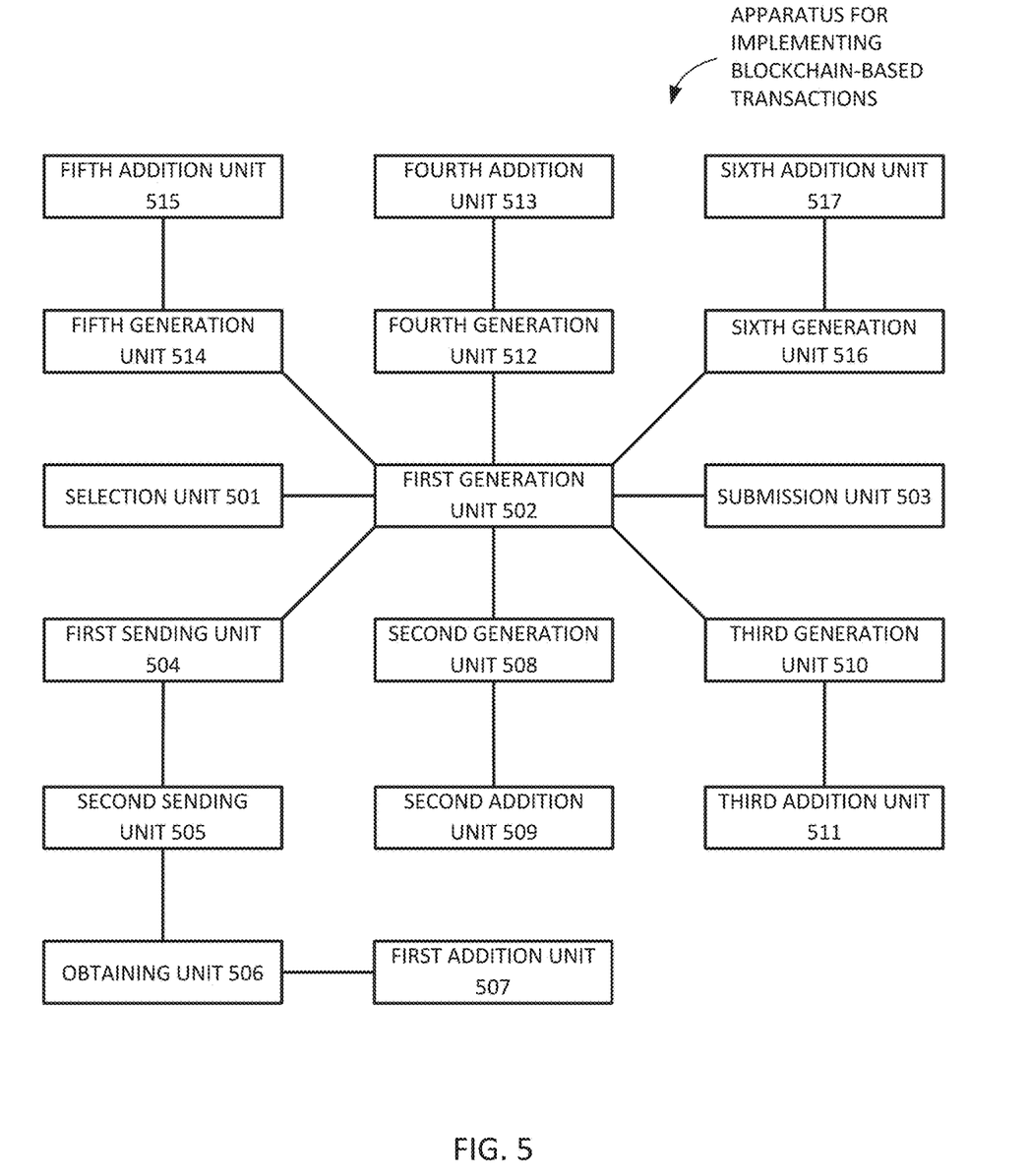
FIG. 5 is a block diagram of an apparatus for implementing blockchain-based transactions according to some embodiments of the specification.

Referring to FIG. 5, a block diagram of an apparatus for implementing blockchain-based transactions is provided according to some embodiments of the specification. As shown in FIG. 5, in the software implementation manner, the terminal interaction apparatus is implementable by computing devices as remitter devices and may comprise: a selection unit 501 for selecting one or more blockchain assets from a remitter's blockchain account according to a transaction amount of a transaction to be remitted from the remitter's blockchain account into the receiver's blockchain account; wherein a total asset amount represented by the selected one or more blockchain assets is not less than the transaction amount, and a commitment of an individual asset amount represented by each of the selected one or more blockchain assets is recorded in the blockchain; a first generation unit 502 for generating a commitment of the transaction amount; and a submission unit 503 for submitting a transaction to the blockchain, wherein the transaction contains the information of the selected one or more blockchain assets and the commitment of the transaction amount, for the selected one or more blockchain assets to be removed from the remitter's blockchain account after the transaction is implemented and one or more blockchain assets corresponding to the commitment of the transaction amount to be added to the receiver's blockchain account after the transaction is implemented.

In some embodiments, the commitment of the transaction amount is obtained by applying a predetermined encryption algorithm to the transaction amount and a transaction random number, and the apparatus further comprises: a first sending unit 504 for sending the transaction random number to a receiver device via an off-chain channel so that the receiver device determines a transaction asset amount represented by the blockchain assets to be added into the receiver's blockchain account according to the predetermined encryption algorithm and the transaction random number.

In some embodiments, the apparatus further comprises: a second sending unit 505 for sending the commitment of the transaction amount to the receiver device via an off-chain channel before submission of the transaction so that the receiver device verifies an association among the commitment of the transaction amount, the transaction random number and the transaction amount.

In some embodiments, the apparatus further comprises: an obtaining unit 506 for obtaining a receiver signature that is generated by the receiver device via a receiver private key and is related to the commitment of the transaction amount, wherein the receiver signature is generated by the receiver device after the association has been verified; and a first addition unit 507 for adding the receiver signature to the transaction so that the blockchain nodes in the blockchain conduct signature verification to verify the receiver signature.

In some embodiments, the apparatus further comprises: a second generation unit 508 for generating a remitter signature related to the commitment of the transaction amount via a remitter private key; and a second addition unit 509 for adding the remitter signature to the transaction so that the blockchain nodes in the blockchain conduct signature verification to verify the remitter signature.

In some embodiments, the apparatus further comprises: a third generation unit 510 for generating a range proof, wherein the range proof is related to the transaction random number, the transaction amount and the commitment of the transaction amount; and a third addition unit 511 for adding the range proof to the transaction so that the blockchain nodes in the blockchain verify whether the transaction amount is not less than zero.

In some embodiments, the apparatus further comprises: a fourth generation unit 512 for generating a commitment of a change amount when the asset amount represented by the selected blockchain assets is more than the transaction amount, wherein the change amount is the difference between the asset amount represented by the selected blockchain assets and the transaction amount; and a fourth addition unit 513 for adding the commitment of the change amount to the transaction, for the blockchain assets corresponding to the commitment of the change amount to be added to the remitter's blockchain account after the transaction is implemented.

In some embodiments, a commitment of an individual asset amount $M_i$ is obtained by applying a homomorphic encryption algorithm to the individual asset amount $p_i$ represented by a selected blockchain asset $P_i$ and an asset random number $r_i$, where $0<i \le k$ and $k$ is the number of the selected blockchain assets, the commitment of the transaction amount T is calculated by using the homomorphic encryption algorithm according to the transaction amount $t$ and the transaction random number $r$, and the commitment of the change amount T0 is calculated by using the homomorphic encryption algorithm according to the change amount $t0$ and a change random number $r0$; and the apparatus further comprises: a fifth generation unit 514 for generating a verification random number $r'$, wherein $r'=r1+ \ldots +rk-r-r0$; and a fifth addition unit 515 for adding the verification random number $r'$ into the transaction so that the blockchain nodes in the blockchain verify whether the input of the transaction is equal to the output of the transaction, wherein the input of the transaction is verified to be equal to the output of the transaction when the verification commitment R', to which the verification random number r' corresponds, satisfies the equation: R'=M1+ . . . +Mk−T−T0.

In some embodiments, the commitment of the change amount is obtained by applying a homomorphic encryption algorithm to the change amount and a change random number, and the apparatus further comprises: a sixth generation unit 516 for generating a range proof, wherein the range proof is related to the change random number, the change amount and the commitment of the change amount; and a sixth addition unit 517 for adding the range proof to the transaction so that the blockchain nodes in the blockchain verify whether the change amount is not less than zero.

The systems, apparatuses, modules or units illustrated in the foregoing embodiments may be achieved by computer chips or entities, or by products with certain functions. A typical device is a computer. An example of the computer may be a personal computer, a laptop computer, a cell phone, a camera phone, a smart phone, a PDA (personal digital assistant), a media player, a navigation device, an email sending and receiving device, a game console, a tablet computer, a wearable device or any combination of a few of these devices.

In a typical configuration, the computer comprises one or more processors (CPU), I/O interfaces, network interfaces and internal memories.

The internal memory may be in a form of volatile memory, random access memory (RAM) and/or non-volatile memory such as read-only memory (ROM) or flash memory (flash RAM) in the computer readable media. Internal memory is an example of computer readable media.

Computer readable media include non-volatile and volatile, movable and non-movable media and may achieve information storage by any method or technology. Information may be computer readable instructions, data structures, program modules or other data. Examples of computer storage media include, but are not limited to, phase change random access memory (PRAM), static random access memory (SRAM), dynamic random access memory (DRAM), other types of random access memory (RAM), read only memory (ROM), electrically erasable programmable read only memory (EEPROM), flash memory or other memory technologies, compact disc-read only memory (CD-ROM), digital versatile disc (DVD) or other optical memory, cassette type magnetic tape, magnetic disk memory, quantum memory, graphene-based storage media, or other magnetic storage devices, or any other non-transfer media, which may be used to store information that is accessible to computing devices. According to the specification, computer readable media do not include transitory media, such as modulated data signals and carriers.

It should be further noted that terms "include," "contain" or any other variants of these terms are intended to cover non-exclusive inclusion so that a process, method, commodity or device including a series of elements not only includes these elements but also includes other elements not clearly set out, or also include the elements inherent to such process, method, commodity or device. In the absence of more limitations, the elements defined by a sentence "include one . . . " do not exclude that the process, method, commodity or device including the elements also have other identical elements.

Embodiments of the present specification are described above. Other embodiments are in the scope of the attached claims. In some embodiments, the actions or steps recorded in the claims may be executed in a sequence different from that given in the embodiments and can still achieve the expected results. Further, it is not necessary for the process described in the accompanying drawings to require the given specific sequence or a continuous sequence in order to achieve the expected results. In some embodiments, multi-tasking processing and parallel processing are also acceptable or may be favorable.

The terms used in one or more embodiments of the present specification are only for the purpose of describing embodiments and not intended to limit one or more embodiments of the present specification. The singular forms "one," "the" and "this" used in one or more embodiments of the present specification and in the attached claims also are intended to cover plural forms unless other meanings are clearly indicated in the context. It should also be understood that the term "and/or" used in the text refers to any or all possible combinations containing one or more the associated listed items.

It should be understood that although one or more embodiments of the present specification may use terms such as first, second and third to describe various kinds of information, the information should not be limited to these terms. These terms are only intended to differentiate information of the same type. For example, without departing from the scope of one or more embodiments of the present specification, first information may also be referred to as second information, and similarly, second information may also be referred to as first information. Subject to the context, the term "if" used here may be interpreted as "at the time of . . . ," "when . . . ," or "in response to determination."

The foregoing specification is only preferred embodiments of one or more embodiments of the present specification and is not intended to limit one or more embodiments of the present specification. Any modifications, equivalent replacements and improvements made without departing from the spirit and principle of one or more embodiments of the present specification shall fall within the scope of one or more embodiments of the present specification.

What is claimed is:

1. A method for implementing blockchain-based transactions, implementable by a computer device associated with a remitter, the method comprising:
   selecting one or more blockchain assets from the remitter's blockchain account according to a transaction amount to be remitted from the remitter's blockchain account into a receiver's blockchain account, wherein a total asset amount of the selected one or more blockchain assets is not less than the transaction amount, and a commitment of an individual asset amount of each of the selected one or more blockchain assets is recorded in a blockchain, wherein a transaction comprises one or more commitments of the selected one or more blockchain assets;
   generating a commitment of the transaction amount by applying an encryption algorithm to the transaction amount and a transaction random number;
   sending, via an off-chain communication channel, the commitment of the transaction amount and the transaction random number to a computer device associated with the receiver for the computing device associated with the receiver to determine, according to the encryption algorithm and the transaction random number, the transaction amount and to verify an association among the commitment of the transaction amount, the transaction random number, and the transaction amount;

obtaining, from the computer device associated with the receiver, a receiver signature at least representing the receiver's endorsement for the commitment of the transaction amount wherein the receiver signature is generated based on a receiver private key of the receiver by the computer device associated with the receiver after successfully verifying the association;

generating a remitter signature at least representing the remitter's endorsement for the commitment of the transaction amount;

adding the commitment of the transaction amount, the remitter signature, and the receiver signature to the transaction for verification by blockchain nodes of a blockchain network corresponding to the blockchain; and submitting to the blockchain network the transaction comprising the one or more commitments of the selected one or more blockchain assets, the remitter signature, the receiver signature, and the commitment of the transaction amount, for the selected one or more blockchain assets to be removed from the remitter's blockchain account and one or more blockchain assets corresponding to the commitment of the transaction amount to be added to the receiver's blockchain account after successful verification of the transaction.

2. The method of claim 1, wherein the encryption algorithm is Pederson Commitment.

3. The method of claim 1, wherein:
the remitter signature is generated based on a remitter private key.

4. The method of claim 1, further comprising:
generating a range proof, wherein the range proof is related to the transaction amount; and
adding the range proof to the transaction.

5. The method of claim 1, before submitting the transaction to the blockchain network, further comprising:
generating a commitment of a change amount in response to the total asset amount of the selected one or more blockchain assets being more than the transaction amount, wherein the change amount is a difference between the total asset amount of the selected one or more blockchain assets and the transaction amount; and
adding the commitment of the change amount to the transaction, for one or more blockchain assets corresponding to the commitment of the change amount to be credited back to the remitter's blockchain account.

6. The method of claim 5, wherein:
the commitment of the individual asset amount (Mi) is obtained by applying a homomorphic encryption algorithm to the individual asset amount (pi) and an asset random number (ri), wherein $0 < i \leq k$ and k is a number of the selected one or more blockchain assets;
the commitment of the transaction amount (T) is obtained by applying the homomorphic encryption algorithm to the transaction amount (t) and a transaction random number (r);
the commitment of the change amount (T0) is obtained by applying the homomorphic encryption algorithm to the change amount (t0) and a change random number (r0); and
before submitting the transaction to the blockchain network, the method further comprises:
generating a verification random number (r'), wherein $r' = r1 + \ldots + rk - r - r0$; and
adding the verification random number (r') to the transaction for the blockchain nodes to verify whether an input of the transaction is equal to an output of the transaction.

7. The method of claim 6, wherein the input of the transaction is verified to be equal to the output of the transaction in response to a verification commitment (R') corresponding to the verification random number r' is equal to $M1 + \ldots + Mk - T - T0$.

8. The method of claim 5, wherein the commitment of the change amount is obtained by applying the homomorphic encryption algorithm to the change amount and a change random number.

9. The method of claim 8, before submitting the transaction to the blockchain network, further comprising:
generating a range proof, wherein the range proof is related to the change amount; and
adding the range proof to the transaction.

10. An apparatus for implementing blockchain-based transactions, comprising: one or more processors and one or more non-transitory computer-readable memories coupled to the one or more processors and configured with instructions executable by the one or more processors to cause the apparatus to perform operations comprising:
selecting one or more blockchain assets from a remitter's blockchain account according to a transaction amount to be remitted from the remitter's blockchain account into a receiver's blockchain account, wherein a total asset amount of the selected one or more blockchain assets is not less than the transaction amount, and a commitment of an individual asset amount of each of the selected one or more blockchain assets is recorded in a blockchain, wherein a transaction comprises one or more commitments of the selected one or more blockchain assets;
generating a commitment of the transaction amount based at least on a transaction random number;
sending, via an off-chain communication channel, the commitment of the transaction amount and the transaction random number to a computer device associated with the receiver;
obtaining, from the computer device associated with the receiver, a receiver signature at least representing the receiver's successful verification and endorsement for the commitment of the transaction amount;
generating a remitter signature at least representing the remitter's successful verification and endorsement for the commitment of the transaction amount;
adding the commitment of the transaction amount, the remitter signature, and the receiver signature to the transaction for verification by blockchain nodes of a blockchain network corresponding to the blockchain; and
submitting to the blockchain network the transaction comprising the one or more commitments of the selected one or more blockchain assets, the remitter signature, the receiver signature, and the commitment of the transaction amount, for the selected one or more blockchain assets to be removed from the remitter's blockchain account and one or more blockchain assets corresponding to the commitment of the transaction amount to be added to the receiver's blockchain account after successful verification of the transaction.

11. The apparatus of claim 10, wherein generating the commitment of the transaction amount comprises applying an encryption algorithm to the transaction amount and the transaction random number.

12. The apparatus of claim 11, wherein the encryption algorithm is Pederson Commitment.

13. The apparatus of claim 11, wherein sending the commitment of the transaction amount and the transaction random number to the computer device associated with the receiver comprises:
sending the commitment of the transaction amount, the transaction random number, and the transaction amount to the computer device associated with the receiver for the computer device associated with the receiver to verify an association among the commitment of the transaction amount, the transaction random number, and the transaction amount.

14. The apparatus of claim 13, wherein:
the receiver signature is generated by the computer device associated with the receiver based on a receiver private key after successfully verifying the association.

15. The apparatus of claim 10, wherein:
the remitter signature is generated based on a remitter private key.

16. The apparatus of claim 10, wherein the operations further comprise:
generating a range proof, wherein the range proof is related to the transaction amount; and
adding the range proof to the transaction.

17. A non-transitory computer-readable storage medium configured with instructions executable by one or more processors to cause the one or more processors to perform operations comprising:
selecting one or more blockchain assets from a remitter's blockchain account according to a transaction amount to be remitted from the remitter's blockchain account into a receiver's blockchain account, wherein a total asset amount of the selected one or more blockchain assets is not less than the transaction amount, and a commitment of an individual asset amount of each of the selected one or more blockchain assets is recorded in a blockchain, wherein a transaction comprises one or more commitments of the selected one or more blockchain assets;
generating a commitment of the transaction amount based at least on a transaction random number;
sending, via an off-chain communication channel, the commitment of the transaction amount and the transaction random number to a computer device associated with the receiver;
obtaining, from the computer device associated with the receiver, a receiver signature at least representing the receiver's successful verification and endorsement for the commitment of the transaction amount;
generating a remitter signature at least representing the remitter's endorsement for the commitment of the transaction amount;
adding the commitment of the transaction amount, the remitter signature, and the receiver signature to the transaction for verification by blockchain nodes of a blockchain network corresponding to the blockchain; and
submitting to the blockchain network the transaction comprising the one or more commitments of the selected one or more blockchain assets, the remitter signature, the receiver signature, and the commitment of the transaction amount.

18. The non-transitory computer-readable storage medium of claim 17, wherein the operations further comprise:
generating a range proof, wherein the range proof is related to the transaction amount; and
adding the range proof to the transaction.

19. The non-transitory computer-readable storage medium of claim 17, wherein before submitting the transaction to the blockchain network, the operations further comprise:
generating a commitment of a change amount in response to the total asset amount of the selected one or more blockchain assets being more than the transaction amount, wherein the change amount is a difference between the total asset amount of the selected one or more blockchain assets and the transaction amount; and
adding the commitment of the change amount to the transaction, for one or more blockchain assets corresponding to the commitment of the change amount to be credited back to the remitter's blockchain account.

20. The non-transitory computer-readable storage medium of claim 19, wherein:
the commitment of the individual asset amount (Mi) is obtained by applying a homomorphic encryption algorithm to the individual asset amount (pi) and an asset random number (ri), wherein $0 < i \leq k$ and k is a number of the selected one or more blockchain assets;
the commitment of the transaction amount (T) is obtained by applying the homomorphic encryption algorithm to the transaction amount (t) and a transaction random number (r);
the commitment of the change amount (T0) is obtained by applying the homomorphic encryption algorithm to the change amount (t0) and a change random number (r0); and
before submitting the transaction to the blockchain network, the operations further comprise:
generating a verification random number (r'), wherein r'=r1+ . . . +rk−r−r0; and
adding the verification random number (r') to the transaction the blockchain nodes to verify whether an input of the transaction is equal to an output of the transaction.

\* \* \* \* \*